Jan. 23, 1951 W. A. NIMZ 2,538,844
BROACHING TOOL
Filed Oct. 19, 1948 2 Sheets-Sheet 2

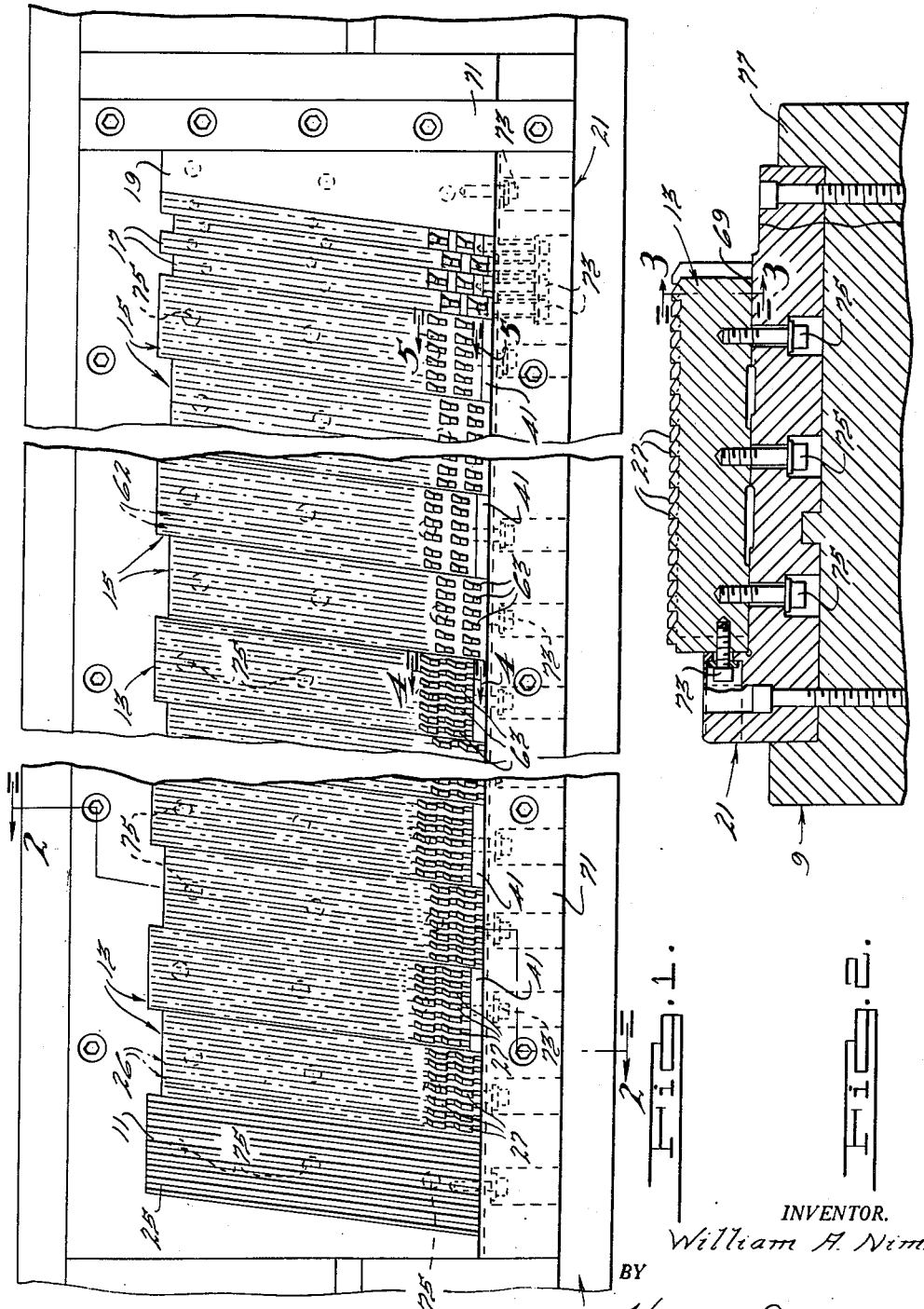

INVENTOR.
William A. Nimz.
BY
Barnes, Dickey & Pierce.
ATTORNEYS.

Patented Jan. 23, 1951

2,538,844

UNITED STATES PATENT OFFICE 2,538,844

BROACHING TOOL

William A. Nimz, Grosse Pointe Woods, Mich., assignor to Colonial Broach Company, Warren Township, Mich., a corporation of Delaware Application October 19, 1948, Serial No. 55,392

2 Claims. (Cl. 90—33)

This invention relates generally to broaches and more particularly to an improved broach for broaching saw teeth or the like.

It has always in the past been thought impossible to broach saw teeth because of the difficulty of properly forming saw teeth having sharp tips. If a saw tooth broach having a plurality of rows of teeth, was made so that the broach teeth were shaped to the exact contour of the saw teeth and spaced in the same manner as the saw teeth, the space between each of the broach teeth would be of a substantially inverted V shape and the adjacent cutting edges of the broach teeth would terminate in a point at their bottom. It would then be necessary to dress the adjacent cutting edges of the broach teeth with a grinding wheel which had a sharp enough edge to dress the bottom point junction of the cutting edges of the teeth so that the broach would form sharp tip apices on the saw teeth. Such a grinding wheel would, of course, wear so rapidly that it would be almost impossible to properly dress the broach. For these and other reasons, the broaching of saw teeth has been thought to be impractical and has not been attempted.

It is an object of this invention to provide a saw tooth broach which is so constructed that the cutting edges of the broach teeth can be easily dressed by any suitable grinding wheel, or the like.

It is a further object of this invention to provide, in a broach of the aforementioned type, a broach element having a row of transversely spaced teeth which are spaced so that the cutting edge of one tooth forms one side of one saw tooth and the opposite cutting edge of an adjacent broach tooth forms the opposite side of another saw tooth; that is, the broach teeth are spaced from each other by at least twice the distance of the saw tooth spacing.

It is a further object of this invention to provide a broach having a plurality of longitudinally spaced broach elements of the aforementioned type which are retained in a holder, with adjacent sections staggered with respect to each other so that the teeth of one broach element will form at least a portion of every other saw tooth space and the teeth of the adjacent broach element will form a similar portion of the alternate saw tooth spaces, thereby forming all of the saw teeth with a broach in which the teeth cutting edges can be easily dressed so as to properly shape and form the saw teeth.

It is a still further object of this invention to provide a broach in which the height of the teeth is greater than their depth of cut in forming the saw teeth, so that it is not necessary to maintain any sharp corners between the cutting edges and their bottoms.

It is a further object of this invention to provide, in a broach of the aforementioned type, a plurality of groups of the aforementioned broach sections which are so arranged that one group of broach sections forms the tips of the saw teeth and a subsequent group of broach sections forms the remainder of the saw tooth spaces without contacting and thereby dulling the saw tooth tips.

It is a still further object of this invention to provide a broach of the aforementioned type which can form a large number of saw teeth, on a large number of adjacent side by side saw blade blanks or strips, in a relatively simple, rapid, efficient and economical manner.

These and other objects of this invention will become apparent from the following detailed description, taken in conjunction with the accompanying drawings, in which:

Figure 1 is a top plan view of the broach of this invention;

Fig. 2 is a sectional view of the structure illustrated in Fig. 1, taken along the line 2—2 thereof;

Figure 3:
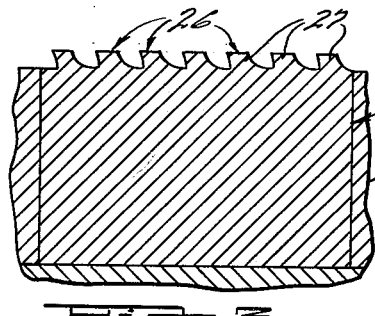
Fig. 3 is an enlarged sectional view of the structure illustrated in Fig. 2, taken along the line 3—3 thereof.

Referring now to the drawings, the broach is generally indicated at 9 and comprises a plurality of longitudinally disposed broach elements, including saw blade topping broach element 11, a plurality of saw tooth tip forming broach elements 13, a plurality of saw tooth gullet forming broach elements 15, a plurality of saw tooth gullet finishing broach elements 17, a spacer element 19, and a broach holder 21, for retaining the broach elements in a predetermined relationship, as will be hereinafter described in detail.

The broach 9 is adapted to form saw teeth simultaneously on a plurality of adjacent side by side strips or blades of metal 23, which are disposed so as to have one edge thereof engageable by the teeth of the broach elements. The broach 9, of course, will be mounted on a suitable broaching machine for reciprocation across one edge of the blades or strips 23. The broach has been designed primarily to form saw teeth on strips of metal for use as band saw blades, but it will be appreciated that saw teeth for any suitable type of saw may be formed by the broach of this invention.

The broach element 11 is disposed at the forward end of the broach 9, and includes a plurality of longitudinally spaced teeth 25, which increase in height from the front to the rear of the broach element. The element 11 is adapted to shave the edges of the saw blades or strips 23 on which the saw teeth are to be formed, in order to insure that the edges of the strips or blades 23 are even, so that the broach elements will cut saw teeth of the same depth on all of the strips.

Figure 4:
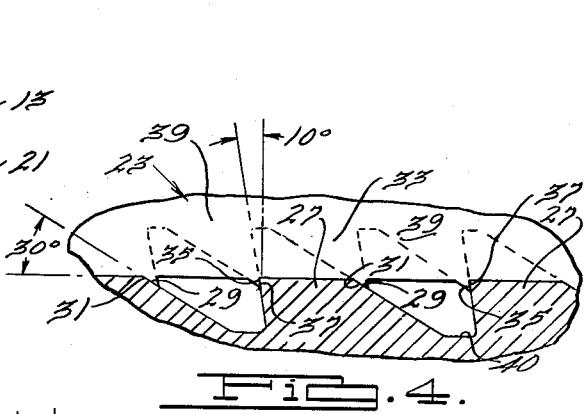
Fig. 4 is an enlarged fragmentary sectional view of the structure illustrated in Fig. 1, taken along the line 4—4 thereof, and illustrating teeth of one broach section forming saw teeth on a blade.
Figure 5:
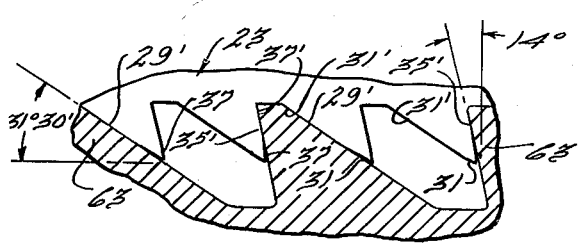
Fig. 5 is an enlarged fragmentary sectional view of the structure illustrated in Fig. 1, taken along the line 5—5 thereof, and illustrating the broach teeth of that broach section forming the saw teeth on a blade.

After the broach element 11 has passed over a strip or blade 23, the saw tooth tip forming broach elements 13 engage the blade to form the saw tooth tips thereon. Each of the broach elements 13 includes a plurality of longitudinally spaced rows 26 of transversely spaced teeth 27. The elements 13 are longitudinally disposed and the teeth increase in height from front to rear so that the broach teeth only cut the saw tooth tips as deep as is illustrated in Fig. 4, which is a sectional view of the rearmost of the elements 13. For most fine tooth saws this depth of cut will not exceed .015" to .020". As can be best seen in Fig. 4, the teeth 27 in each row are spaced so that one cutting edge 29 of one tooth 27 forms one side 31 of the tip portion of one saw tooth 33, while the adjacent opposite cutting edge 35 of another broach 27 cuts the opposite side 37 of the tip portion of another saw tooth 39. That is, the broach teeth 27 in each row are spaced at least twice the distance of the saw tooth spacing. The broach teeth are also deeper than their depth of cut in forming the saw teeth, for a reason which will hereinafter appear, and the bottom of each space, between the broach teeth, is defined by a flat surface 40. Therefore, the forwardmost of the broach elements 13 will partially form only every other space between the saw teeth. The adjacent broach element 13, as can be seen in Fig. 1, is transversely offset with respect to the preceding broach element 13 by means of a spacer 41, so that the teeth of that element will partially form the spaces between the saw teeth which are skipped by the teeth of the first element 13. With this arrangement, one side of a saw toooth, for example tooth 33, is partially formed by a tooth 27 of the first broach element 13, while the opposite side of the same tooth 33, is partially formed by a tooth 27 of the adjacent offset broach element 13. The broach teeth could, of course, be spaced so as to skip a greater number of tooth spaces if the adjacent broach sections were correspondingly offset or staggered.

All of the broach elements 13 are staggered in the same manner as the first pair, above described.

Figure 6:
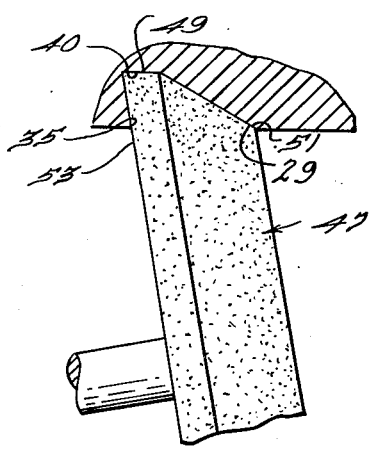
Fig. 6 is a sectional view illustrating a grinding wheel dressing the cutting edges of adjacent teeth of the broach of this invention.
Figure 8:
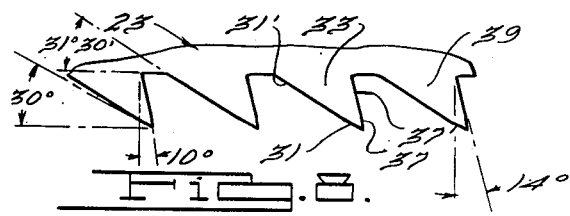
Fig. 8 is an enlarged fragmentary side elevaitonal view of a saw blade having the teeth thereof formed by the broach of this invention.

As the depth of the broach teeth 27 is greater than their depth of cut in forming the saw teeth, the apex of the tip of each saw tooth will be formed above the flat bottom 40 which extends between the adjacent teeth of the broach elements. In the embodiment illustrated in the drawings, the cutting edges 29 of the teeth 27, as shown in Fig. 4, are disposed at a 30° angle with respect to the horizontal and the opposite cutting edges 35 of the broach teeth 27 are disposed at a 10° angle with respect to the vertical. The saw tooth tips, therefore, will be completely formed on each strip or blade after all the broach elements 13 have formed their respective portions of the saw tooth spaces in the blades 23. Also, as the broach teeth are deeper than their depth of cut in forming the saw teeth, it is not necessary to maintain a sharp corner junction between the broach teeth cutting edges and the bottom flat portion 40, which interconnects the broach teeth, hereby permitting the broach teeth to be dressed by a grinding wheel 47, such as shown in Fig. 6.

Figure 7:
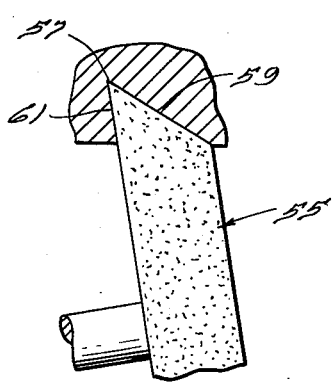
Fig. 7 is a view similar to Fig. 6, illustrating a grinding wheel dressing the cutting edges of broach teeth in which the teeth are spaced and shaped in the same manner as the saw teeth to be formed.

The grinding wheel 47 is formed with a portion 49 for dressing the flat bottoms 40 between the teeth, and an inclined portion 51 for dressing the cutting edges 29 of the teeth. One side face 53 of the grinding wheel will dress the cutting edges 35 of the broach teeth. It is not necessary that the corner between the grinding wheel face 53 and peripheral portion 49 be maintained sharp, as it is not necessary to maintain a sharp corner between the broach teeth cutting edges 35 and the bottom portions 40. Thus, with this arrangement, it is possible to dress the broach teeth in a conventional manner, without trying to maintain any sharp edges on the grinding wheel 47, which would wear rapidly and make such dressing almost impossible. If the broach teeth were formed with the same contour and same spacing as the saw teeth, as shown in Fig. 7, it would be necessary to employ a grinding wheel 55, which would have to have a sharp peripheral corner or edge 57 between the dressing surfaces 59 and 61 of the wheel. Obviously, it would be almost impossible to maintain the corner or edge 57 extremely sharp so as to form a point like junction between the cutting edges of the adjacent broach teeth. Thus, this latter arrangement would be impractical and would render it almost impossible to broach saw teeth which would have sharp tips, as is required.

The broach elements 13 are thus arranged in an alternate staggered relationship, so as to completely form the sharp tips of the saw teeth. After the saw teeth tips have been formed, the broach elements 15 engage the saw blades or strips 23 to form the saw tooth gullets, or the remainder of the spaces between the saw teeth, below the saw tooth tips. The broach elements 15 are provided with a plurality of longitudinally spaced rows 62 of transversely spaced teeth 63, which are spaced in the same manner as the teeth 27 of the broach elements 13, and the adjacent broach elements are transversely offset in the same manner as the broach elements 13, so that each element forms alternate spaces between the saw teeth. The cutting edges 29' and 35' of the broach teeth 63 are disposed on different angles than the cutting edges of the broach teeth 27 and form the saw tooth portions 31' and 37', respectively. For example, the cutting edges 29' of the broach teeth 63 are illustrated as being disposed on an angle of 31° 30', with respect to the horizontal, while the cutting edges 35' are disposed on an angle of 14° with respect to the vertical, so that when the teeth of the broach elements 15 move through the spaces between the saw teeth, the broach teeth 63 will form the portions of saw spaces below the saw tooth tips without touching the saw tooth tips. It will, however, be appreciated that the lower portions of the cutting edges of the teeth 63 could be cut back in any suitable manner so as not to engage the saw teeth tips during the gullet forming operation. Thus, the saw tooth gullets are formed by the broach elements 15, without the teeth of the latter elements touching the saw tips and tending to dull them.

The broach elements 17, which are disposed rearwardly of the broach elements 15, are arranged in much the same manner as the broach elements 13 and 15, and are provided to finish the gullet portions of the saw tooth spaces and remove any burrs from the saw teeth, without engaging the saw tooth tip portions.

The broach elements 11, 13, 15 and 17 are positioned in the holder 21 with the rearwardmost broach element 17 abutting one face of the spacer 19, which is positioned on the upper flat surface 69 of the broach holder 21 with its back face engaging an end plate 71 of the holder. All of the broach elements are then positioned on the upper flat surface 69 of the broach holder and the alternate broach elements are transversely offset with respect to their previous element by means of the spacers 41, which are disposed between one end of the broach elements and a side wall 71 of the holder. The broach elements are positioned in end to end longitudinally abutting relationship and are pulled tight against the side wall 71 of the holder by means of cap screws 73, which are mounted in the wall 71 and threaded into the ends of the broach elements. After the broach elements are pulled against the wall 71 and are in an abutting longitudinal end to end relationship, they are secured to the broach holder bottom portion 69 by means of a plurality of cap screws 75. Thus, the broach elements are secured in their predetermined relationship in the broach holder and the broach holder may then be secured to any suitable plate or the like 77, of the broaching machine, for operation against the saw blades or strips 23. The broaching elements are, therefore, positioned to perform the aforementioned operation of forming the saw teeth and with this broach a large number of adjacent saw tooth blades or strips can be formed simultaneously.

It will, therefore, be appreciated that the broach of this invention can rapidly, efficiently and economically form saw teeth in blades or strips and the broach teeth may easily be dressed by a generally conventional type of grinding wheel, rather than with a wheel in which a sharp edge must be maintained in order to dress the broach teeth so that they will form sharp tips on the saw teeth.

What is claimed is:

1. A broach for forming teeth on a workpiece including a plurality of broach elements, the forwardmost element of said broach being adapted to shave one edge of said workpiece, a group of longitudinally disposed saw tooth tip forming broach elements disposed rearwardly of said first element and comprising a plurality of longitudinally spaced rows of transversely spaced teeth, each tooth in each row being transversely spaced from its adjacent tooth by at least twice the distance of the tooth spacing to be formed on the work element, the teeth of each of said broach elements being transversely spaced with respect to the teeth of another element in said group by at least the distance of one tooth space of the work, so that the teeth on the transversely spaced elements of said group will form adjacent tooth spaces on the work, a group of longitudinally disposed saw tooth gullet forming broach elements provided rearwardly of said first group and each of said latter broach elements including a plurality of longitudinally spaced rows of transversely spaced teeth, each tooth of each row being transversely spaced from its adjacent tooth by at least twice the distance of the tooth spacing to be formed on the work, and each of said broach elements of said second group being transversely offset with respect to another element of said group at least the distance of one tooth space on said work element, so that teeth on the transversely spaced elements will form adjacent tooth spaces on the work, the teeth of the second group of broach elements having the cutting edges thereof disposed on a different angle than the angle of the cutting edges of the teeth of said first group, so as to form the gullets of said work element teeth without contacting the tips of said teeth formed by said first group.

2. A broach for forming saw teeth, including a plurality of longitudinally disposed broach elements, holder means for retaining said broach elements in a predetermined relationship, each of said broach elements having a plurality of transversely spaced teeth, the cutting edge on one side of the space between each of said teeth being adapted to form one side of a saw tooth and the cutting edge on the opposite side of the space between each of said teeth being adapted to form the opposite side of another saw tooth, the teeth of each of said elements being transversely offset with respect to the teeth of another of said elements so that the teeth of the offset elements form adjacent tooth spaces, one group of said broach elements being adapted to form the tips of the saw teeth and a second group of said elements being disposed rearwardly of said first group with the teeth thereof having their cutting edges disposed on a different angle than the angle of the cutting edges of the teeth of said first group, so as to form the remainder of the saw tooth spaces without touching the prior formed saw tooth tips.

WILLIAM A. NIMZ.

REFERENCES CITED

The following references are of record in the file of this patent:

UNITED STATES PATENTS

| Number | Name | Date |
| --- | --- | --- |
| 2,439,822 | Phaneuf | Apr. 20, 1948 |